United States Patent
Bishop et al.

(10) Patent No.: US 7,344,631 B2
(45) Date of Patent: *Mar. 18, 2008

(54) OXYGENATE TREATMENT OF DEWAXING CATALYST FOR GREATER YIELD OF DEWAXED PRODUCT

(75) Inventors: Adeana Richelle Bishop, Bethlehem, PA (US); William Berlin Genetti, Woodbridge, VA (US); Jack Wayne Johnson, Clinton, NJ (US); Loren Leon Ansell, Baton Rouge, LA (US); Nancy Marie Page, Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 518 days.

This patent is subject to a terminal disclaimer.

(21) Appl. No.: 10/652,390

(22) Filed: Aug. 29, 2003

(65) Prior Publication Data

US 2004/0072676 A1    Apr. 15, 2004

Related U.S. Application Data

(60) Provisional application No. 60/416,950, filed on Oct. 8, 2002.

(51) Int. Cl.
    *C10G 73/38* (2006.01)

(52) U.S. Cl. .............. 208/27; 208/108; 208/111.35; 502/64; 502/326

(58) Field of Classification Search .............. 208/27, 208/108, 111.3, 111.35; 502/64, 326
See application file for complete search history.

(56) References Cited

U.S. PATENT DOCUMENTS

| | | | |
|---|---|---|---|
| 2,250,410 A | 7/1941 | van Peski | 260/676 |
| 3,711,399 A | 1/1973 | Estes et al. | 208/112 |
| 4,053,532 A | 10/1977 | Ireland et al. | 260/676 R |
| 4,097,364 A | 6/1978 | Egan | 208/111 |
| 4,181,597 A | 1/1980 | Yan et al. | 208/46 |
| 4,335,019 A | 6/1982 | Bowes et al. | 252/450 |
| 4,377,469 A | 3/1983 | Shihabi | 208/111 |
| 4,388,177 A | 6/1983 | Bowes et al. | 208/111 |
| 4,402,866 A | 9/1983 | Shihabi | 252/455 |
| 4,431,516 A | 2/1984 | Baird et al. | 208/111 |
| 4,431,517 A | 2/1984 | Nevitt et al. | 208/111 |
| 4,431,519 A | 2/1984 | LaPierre et al. | 208/111 |

(Continued)

FOREIGN PATENT DOCUMENTS

EP    0140468    5/1985

(Continued)

*Primary Examiner*—Glenn Caldarola
*Assistant Examiner*—Prem C. Singh
(74) *Attorney, Agent, or Firm*—M. D. Marin; J. J. Allocca

(57) ABSTRACT

Fischer-Tropsch hydrocarbon synthesis using a noncobalt catalyst is used to produce waxy fuel and lubricant oil hydrocarbons from synthesis gas derived from natural gas. The waxy hydrocarbons are hydrodewaxed, with reduced conversion to lower boiling hydrocarbons, by contacting the waxy hydrocarbons, in the presence of hydrogen, with an unsulfided hydrodewaxing catalyst that has been reduced and then treated by contacting it with a stream containing one or more oxygenates.

36 Claims, 4 Drawing Sheets

U.S. PATENT DOCUMENTS

| | | | |
|---|---|---|---|
| 4,431,527 A | 2/1984 | Miller et al. | 208/254 |
| 4,436,614 A | 3/1984 | Olbrich et al. | 208/89 |
| 4,460,698 A | 7/1984 | Hensley, Jr. et al. | 502/66 |
| 4,483,764 A | 11/1984 | Hensley, Jr. et al. | 208/111 |
| 4,490,242 A | 12/1984 | Oleck et al. | 208/97 |
| 4,510,045 A | 4/1985 | Dessau | 208/111 |
| 4,568,449 A | 2/1986 | Angmorter et al. | 208/216 |
| 4,594,146 A | 6/1986 | Chester et al. | 208/111 |
| 4,599,162 A | 7/1986 | Yen | 208/59 |
| 4,601,993 A | 7/1986 | Chu et al. | 502/66 |
| 4,610,778 A | 9/1986 | Graven | 208/89 |
| 4,622,130 A | 11/1986 | Stem | 208/87 |
| 4,636,299 A | 1/1987 | Unmuth et al. | 208/87 |
| 4,642,176 A * | 2/1987 | Adams et al. | 208/111.3 |
| 4,684,756 A | 8/1987 | Derr, Jr. | 585/330 |
| 4,784,747 A | 11/1988 | Shihabi | 208/111 |
| 4,808,296 A | 2/1989 | Chen et al. | 208/111 |
| 4,810,357 A | 3/1989 | Chester et al. | 208/78 |
| 4,867,862 A * | 9/1989 | Ziemer | 208/27 |
| 4,908,120 A | 3/1990 | Bowes et al. | 208/59 |
| 4,911,821 A | 3/1990 | Katzer et al. | 208/27 |
| 4,919,788 A | 4/1990 | Chen et al. | 208/59 |
| 4,921,593 A | 5/1990 | Smith | 208/59 |
| 4,954,325 A | 9/1990 | Rubin et al. | 423/328 |
| 4,975,177 A | 12/1990 | Garwood et al. | 208/27 |
| 5,015,361 A | 5/1991 | Anthes et al. | 208/111 |
| 5,017,535 A | 5/1991 | Schoonhoven et al. | 502/30 |
| 5,037,528 A | 8/1991 | Garwood et al. | 208/27 |
| 5,059,299 A | 10/1991 | Cody et al. | 208/27 |
| 5,075,269 A | 12/1991 | Degnan et al. | 502/77 |
| 5,110,445 A | 5/1992 | Chen et al. | 208/96 |
| 5,110,573 A | 5/1992 | Johnson | 423/328 |
| 5,146,022 A | 9/1992 | Buchanan et al. | 585/12 |
| 5,164,169 A | 11/1992 | Rubin | 423/709 |
| 5,164,170 A | 11/1992 | Rubin | 423/709 |
| 5,208,403 A | 5/1993 | Buchanan et al. | 585/7 |
| 5,232,579 A | 8/1993 | Absil et al. | 208/113 |
| 5,246,566 A | 9/1993 | Miller | 208/27 |
| 5,275,719 A | 1/1994 | Baker, Jr. et al. | 208/58 |
| 5,276,229 A | 1/1994 | Buchanan et al. | 585/255 |
| 5,284,985 A | 2/1994 | Girgis et al. | 585/310 |
| 5,288,395 A | 2/1994 | Marler et al. | 208/58 |
| 5,344,849 A * | 9/1994 | Ayasse | 518/713 |
| 5,358,628 A | 10/1994 | Apelian et al. | 208/60 |
| 5,362,378 A | 11/1994 | Borghard et al. | 208/138 |
| 5,399,337 A | 3/1995 | Schmitt | 423/705 |
| 5,405,596 A | 4/1995 | Moini et al. | 423/705 |
| 5,419,830 A | 5/1995 | Chou et al. | 219/111 |
| 5,456,820 A | 10/1995 | Forbus, Jr. et al. | 208/111 |
| 5,475,178 A | 12/1995 | Del Rossi et al. | 585/455 |
| 5,488,191 A | 1/1996 | Chu et al. | 585/10 |
| 5,498,821 A | 3/1996 | Ryan et al. | 585/750 |
| 5,516,736 A | 5/1996 | Chang et al. | 502/64 |
| 5,603,822 A | 2/1997 | Forbus, Jr. et al. | 208/111 |
| 5,603,824 A | 2/1997 | Kyan et al. | 208/208 |
| 5,611,192 A | 3/1997 | Weder | 53/221 |
| 5,612,270 A | 3/1997 | Beck et al. | 502/64 |
| 5,637,784 A | 6/1997 | Chu et al. | 585/14 |
| 5,643,440 A | 7/1997 | Borghard et al. | 208/58 |
| 5,689,031 A | 11/1997 | Berlowitz et al. | 585/734 |
| 5,730,858 A | 3/1998 | Olivier et al. | 208/24 |
| 5,779,882 A | 7/1998 | Chester et al. | 208/120 |
| 5,780,382 A | 7/1998 | Chang et al. | 502/309 |
| 5,780,703 A | 7/1998 | Chang et al. | 585/732 |
| 5,827,491 A | 10/1998 | Emerson et al. | 423/328.2 |
| 5,833,840 A | 11/1998 | Absil et al. | 208/120 |
| 5,849,968 A | 12/1998 | Beck et al. | 585/481 |
| 5,854,170 A | 12/1998 | Chang et al. | 502/308 |
| 5,885,438 A | 3/1999 | Apelian et al. | 208/27 |
| 5,911,874 A | 6/1999 | Cody et al. | 208/87 |
| 5,935,417 A | 8/1999 | Cody et al. | 208/87 |
| 5,951,848 A | 9/1999 | Baker, Jr. et al. | 208/28 |
| 5,961,951 A | 10/1999 | Kennedy et al. | 423/708 |
| 5,976,201 A | 11/1999 | Barry et al. | 44/413 |
| 5,976,351 A | 11/1999 | Apelian et al. | 208/27 |
| 5,993,644 A | 11/1999 | Xiao et al. | 208/89 |
| 6,013,171 A | 1/2000 | Cook et al. | 208/27 |
| 6,051,129 A | 4/2000 | Harris et al. | 208/138 |
| 6,080,301 A | 6/2000 | Berlowitz et al. | 208/18 |
| 6,080,904 A | 6/2000 | Chang et al. | 585/751 |
| 6,090,989 A | 7/2000 | Trewella et al. | 585/13 |
| 6,096,189 A | 8/2000 | Cody et al. | 208/87 |
| 6,099,719 A | 8/2000 | Cody et al. | 208/87 |
| 6,103,101 A | 8/2000 | Fragelli et al. | 208/89 |
| 6,136,181 A | 10/2000 | Ziemer | 208/144 |
| 6,179,994 B1 | 1/2001 | Clark et al. | 208/27 |
| 6,180,068 B1 | 1/2001 | Boyd et al. | 422/195 |
| 6,180,575 B1 | 1/2001 | Nipe | 508/227 |
| 6,190,532 B1 | 2/2001 | Degnan et al. | 208/27 |
| 6,210,563 B1 | 4/2001 | Tsao et al. | 208/138 |
| 6,217,747 B1 | 4/2001 | Chang et al. | 208/112 |
| 6,231,749 B1 | 5/2001 | Degnan et al. | 208/27 |
| 6,261,441 B1 | 7/2001 | Gentry et al. | 208/58 |
| 6,264,826 B1 | 7/2001 | Xiao et al. | 208/18 |
| 6,277,355 B1 | 8/2001 | Kennedy et al. | 423/705 |
| 6,287,454 B1 | 9/2001 | Forbus, Jr. et al. | 208/28 |
| 6,294,077 B1 | 9/2001 | Dougherty et al. | 208/27 |
| 6,306,362 B1 | 10/2001 | Han et al. | 423/702 |
| 6,310,265 B1 | 10/2001 | Chester et al. | 585/739 |
| 6,319,487 B1 | 11/2001 | Liu et al. | 423/706 |
| 6,322,692 B1 | 11/2001 | Cody et al. | 208/18 |
| 6,337,010 B1 | 1/2002 | Hofer | 208/58 |
| 6,339,051 B1 | 1/2002 | Carey et al. | 508/391 |
| 6,346,498 B1 | 2/2002 | Chang et al. | 502/64 |
| 6,362,123 B1 | 3/2002 | Tsao et al. | 502/74 |
| 6,416,654 B1 | 7/2002 | Chou et al. | 208/27 |
| 6,420,063 B1 | 7/2002 | Ozin et al. | 429/40 |
| 6,420,618 B1 | 7/2002 | Berlowitz et al. | 585/310 |
| 6,504,075 B2 | 1/2003 | Beck et al. | 585/475 |
| 6,506,703 B1 | 1/2003 | Kao et al. | 502/66 |
| 6,627,779 B2 | 9/2003 | O'Rear | |
| 6,663,768 B1 | 12/2003 | Miller | 208/27 |
| 7,201,838 B2 * | 4/2007 | Bishop et al. | 208/89 |
| 2001/0001449 A1 | 5/2001 | Kiliany et al. | 208/111.01 |
| 2001/0004972 A1 | 6/2001 | Miller et al. | 208/18 |
| 2001/0006154 A1 | 7/2001 | Krug et al. | 208/18 |
| 2002/0003102 A1 | 1/2002 | O'Rear et al. | 208/18 |
| 2003/0168379 A1 | 9/2003 | Degnan et al. | 208/27 |

FOREIGN PATENT DOCUMENTS

| | | |
|---|---|---|
| EP | 0147873 B1 | 3/1988 |
| EP | 0512635 A2 | 11/1992 |
| EP | 0635557 A1 | 1/1995 |
| EP | 0707057 A1 | 4/1996 |
| EP | 0909304 B1 | 4/1999 |
| EP | 0668342 B1 | 8/1999 |
| FR | 2805543 | 2/2000 |
| FR | 2805542 | 8/2001 |
| GB | 772478 | 4/1957 |
| GB | 1582789 | 1/1981 |
| GB | 2109402 | 6/1983 |
| GB | 2311789 | 10/1997 |
| SU | 1696391 | 12/1991 |
| WO | WO96/03359 A1 | 2/1996 |
| WO | WO96/13563 | 5/1996 |
| WO | WO96/26993 | 9/1996 |
| WO | WO96/34930 | 11/1996 |
| WO | WO97/18278 | 5/1997 |
| WO | WO98/18883 | 5/1998 |
| WO | WO99/20720 | 4/1999 |
| WO | WO99/35087 | 7/1999 |
| WO | WO99/41336 | 8/1999 |
| WO | WO01/07538 A1 | 2/2001 |

| | | | | | | |
|---|---|---|---|---|---|---|
| WO | WO01/18156 | 3/2001 | | WO | WO02/48291 | 6/2002 |
| WO | WO01/57166 A1 | 8/2001 | | WO | WO02/088279 | 11/2002 |
| WO | WO01/64339 | 9/2001 | | WO | WO02/099014 | 12/2002 |
| WO | WO01/64339 A1 | 9/2001 | | | | |
| WO | WO02/48283 | 6/2002 | | * cited by examiner | | |

OXYGENATE TREATMENT OF DEWAXING CATALYST FOR GREATER YIELD OF DEWAXED PRODUCT

This application claims the benefit of U.S. Provisional Application No. 60/416,950 filed Oct. 8, 2002.

BACKGROUND OF THE DISCLOSURE

1. Field of the Invention

The invention relates to hydrodewaxing hydrocarbons over an unsulfided dewaxing catalyst treated with oxygenates. More particularly the invention relates to the catalyst and to producing dewaxed fuel and lubricant oil fractions, from waxy hydrocarbons synthesized by reacting $H_2$ and CO produced from natural gas in the presence of a Fischer-Tropsch catalyst, by hydrodewaxing the waxy hydrocarbons over an unsulfided dewaxing catalyst that has been treated by contacting it with oxygenates.

2. Background of the Invention

Fuels and lubricants are made by incorporating various additives into base stocks, which typically comprise dewaxed hydrocarbon fractions derived from waxy hydrocarbons that boil in the desired fuel and lubricant oil ranges. Dewaxing reduces the pour and cloud points of the waxy hydrocarbons, to acceptable levels. The relatively pure waxy and paraffinic hydrocarbons synthesized by the Fischer-Tropsch process are an excellent feed for producing diesel fuel, jet fuel and premium lubricant oils with low sulfur, nitrogen and aromatics contents. The sulfur, nitrogen, and aromatics content of these waxy hydrocarbons is essentially nil and the raw hydrocarbons can therefore be passed to upgrading operations, without prior hydrogenation treatment. In a Fischer-Tropsch process, $H_2$ and CO react in the presence of a hydrocarbon synthesis catalyst to form waxy hydrocarbons. Those waxy hydrocarbon fractions that are solid at ambient conditions are referred to as Fischer-Tropsch wax and typically include hydrocarbons boiling in both the fuels and lubricant oil ranges. However, they have cloud and pour points too high to be useful as fuels and lubricant oils and must therefore be further processed (e.g., dewaxed) to meet acceptably low levels of cloud and pour points. Solvent dewaxing cannot be used, because the yield of dewaxed hydrocarbons boiling in the distillate fuels range will be substantially reduced and the higher molecular weight (e.g., $C_{16+}$) hydrocarbons comprising the lubricant oil fractions are typically solid at ambient temperature. Various processes have been disclosed for catalytically dewaxing waxy hydrocarbons. Many, such as those employing a ZSM-5 catalyst, dewax by hydrocracking the waxy hydrocarbons to products boiling below the fuel and lubricant oil ranges. Others include hydroprocessing for removal of heteroatoms, aromatics and other unsaturates. Illustrative, but non-limiting examples of various catalytic dewaxing processes are disclosed in, for example, U.S. Pat. Nos. 6,179,994; 6,090,989; 6,080,301; 6,051,129; 5,689,031; 5,075,269 and EP 0 668 342 B1.

More recently, catalysts that dewax mostly by isomerization have been discovered (as disclosed in, for example, in U.S. Pat. No. 5,075,269) and these produce greater dewaxed product yield, due to less cracking. However, even the best of these catalysts have some cracking activity and concomitant dewaxed product loss. Catalyst having a high cracking activity are especially undesired for the dewaxing of hydrocarbons that do not contain high amounts of waxes, e.g., because they have been produced using a non-cobalt Fischer-Tropsch catalyst. Sulfiding a dewaxing catalyst may reduce its cracking activity, as is well known in the art, but sulfiding may contaminate both the dewaxed product and the hydrogen reaction gas passing through the dewaxing reactor. It would be an improvement to the art if an alternative catalyst treatment could be found that does not require sulfiding and that does still give good hydrodewaxing results even with waxy hydrocarbons that do not contain high amounts of waxes. Also, the catalyst should have a reduced cracking activity during hydrodewaxing the hydrocarbons produced by noncobalt Fischer-Tropsch hydrocarbons synthesis, and thereby increase its isomerization dewaxing activity and contaminant dewaxed product yield.

SUMMARY OF THE INVENTION

It has now been found that waxy hydrocarbons produced from a Fischer-Tropsch hydrocarbon synthesis process using a noncobalt catalyst, including fuel and lubricant fractions, can be hydrodewaxed with reduced conversion to lower boiling hydrocarbons, using an unsulfided catalyst that has been reduced and then contacted with an oxygenate-containing hydrocarbon.

In one embodiment the invention relates to (a) producing a synthesis gas from natural gas, (b) reacting the $H_2$ and CO in the gas in the presence of a noncobalt Fischer-Tropsch catalyst, at reaction conditions effective to synthesize waxy hydrocarbons comprising fractions boiling in the fuels and lubricant oil ranges, and (c) passing at least a portion of the waxy hydrocarbons to an upgrading facility in which they are hydrodewaxed with hydrogen and an unsulfided catalyst that has been contacted with an oxygenate-containing hydrocarbon. A process in which natural gas is converted to synthesis gas which, in turn, is converted to hydrocarbons, is referred to as a gas conversion process. Thus, this embodiment relates to a gas conversion process plus product upgrading by hydrodewaxing.

The hydrodewaxing process comprises contacting the waxy hydrocarbons with hydrogen and a dewaxing catalyst that has been treated by contacting the catalyst with a hydrocarbon containing one or more oxygenates. Alternatively, a waxy hydrocarbon to be hydrodewaxed and containing one or more oxygenates may be contacted with the dewaxing catalyst. The dewaxing catalyst may be reduced and left unsulfided and is preferably both reduced and unsulfided. This treatment reduces hydrodewaxed product loss due to feed conversion to lower boiling hydrocarbons, by reducing the cracking activity of the dewaxing catalyst and is conducted either in-situ or ex-situ of the hydrodewaxing reactor. Experiments have shown that an oxygenate treated hydrodewaxing catalyst, e.g. a ZSM-48 hydrodewaxing catalyst, is equivalent to one that has been sulfided with respect to feed conversion to lower boiling hydrocarbons and lower methane make. As used herein, ZSM-48 includes EU-2, EU-11 and ZBM-30, which are structurally equivalent to ZSM-48.

The noncobalt Fischer Tropsch catalyst refers to a catalyst wherein the active catalyst component is a metal other than cobalt including at least one of Fe, Ni, Ru, Re and Rh.

The hydrocarbon containing the one or more oxygenates used for the treatment will comprise at least a portion of the waxy hydrocarbons synthesized over the Fischer Tropsch catalyst and may or may not comprise the waxy hydrocarbon feed to be hydrodewaxed. The term "oxygenate" refers to water and oxygen-containing compound(s) which form water under hydrodewaxing conditions. The oxygenate(s) used during the treatment may comprise water or one or more oxygen containing molecules, which preferably comprise functional groups containing hydroxyl, mono and polyhydric alcohols, esters, ethers, ketones, aldehydes, carboxylic acids and mixtures thereof and preferably including one or more alcohols. They may be indigenous to the waxy hydrocarbons synthesized over the catalyst in the Fischer-Tropsch hydrocarbon synthesis reactor, and/or they may be added to it for the treatment. When the oxygenate treatment uses water as the oxygenate, water is added after the dewaxing catalyst has been reduced. The continuing presence after the treatment, of the treatment oxygenates in the feed being hydrodewaxed, has no adverse effect on the catalyst, the hydrodewaxing reaction or the hydrodewaxed product. Thus an oxygenates-containing, waxy hydrocarbon fraction produced by a catalyzed Fischer-Tropsch hydrocarbon synthesis reaction, may be used for the catalyst treatment and then hydrodewaxed with no adverse effect resulting from the continuing presence of the oxygenates in the wax. In the examples below, a preferred hydrodewaxing catalyst, ZSM-48, was successfully treated with an oxygenates-containing, raw Fischer-Tropsch wax and also with an oxygenates-containing Fischer-Tropsch light oil having an end boiling point of about 525° F. (274° C.), each of which was synthesized over a non-shifting cobalt hydrocarbon synthesis catalyst.

DETAILED DESCRIPTION

Figure 1:
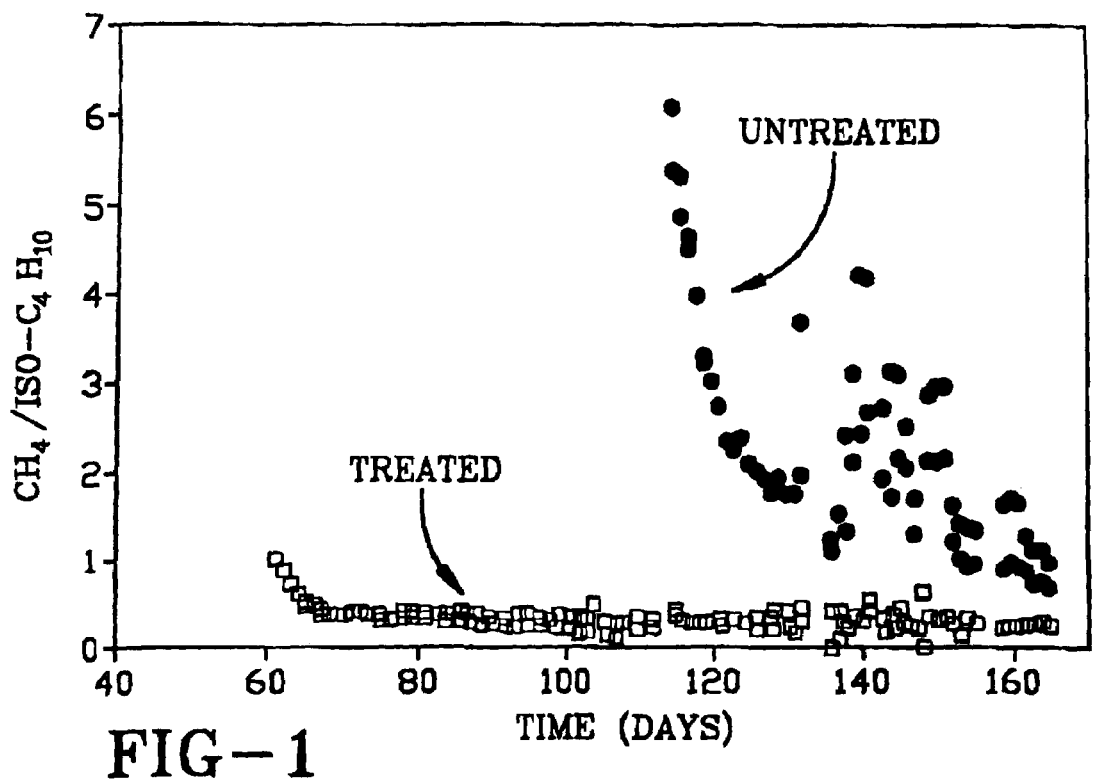
FIG. 1 shows the hydrogenolysis to beta scission ratio for the treated catalyst of the invention compared to the untreated catalyst.

The dewaxing catalyst for hydrodewaxing of waxy feeds may be either crystalline or amorphous. Crystalline materials are molecular sieves that contain at least one 10 or 12 ring channel and may be based on alumino-silicates (zeolites). Zeolites used for oxygenate treatment may contain at least one 10 or 12 ring channel. Examples of such zeolites include ZSM-5, ZSM-11, ZSM-22, ZSM-23, ZSM-35, ZSM-48, ZSM-57, ferrierite, EU-1, NU-87, ITQ-13, and MCM-71. Examples of molecular sieves containing 12 ring channels include zeolite beta, ZSM-12, MCM-68, ZSM-18, mordenite, faujasite and offretite It should be noted that a dewaxing catalyst such as ZSM-5 can have altered dewaxing properties by adjusting catalyst properties, such as acidity, metal dispersion and catalyst particle size as noted in U.S. Pat. No. 6,294,077. The molecular sieves are described in U.S. Pat. Nos. 5,246,566, 5,282,958, 4,975,177, 4,397,827, 4,585,747, and 5,075,269. MCM-68 is described in U.S. Pat. No. 6,310,265. MCM-71 and ITQ-13 are described in PCT published applications WO 0242207 and WO 0078677. Preferred catalysts include ZSM-48, ZSM-22 and ZSM-23. Especially preferred is ZSM-48. The molecular sieves are preferably in the hydrogen form. Reduction can occur in situ during the dewaxing step itself or can occur ex situ in another vessel.

Amorphous dewaxing catalysts include alumina, fluorided alumina, silica-alumina, fluorided silica-alumina and silica-alumina doped with Group 3 metals. Such catalysts are described for example in U.S Pat. Nos. 4,900,707 and 6,383,366.

The dewaxing catalysts are bifunctional, i.e., they are loaded with a metal hydrogenation component, which is at least one Group VI metal, at least one Group VIII metal, or mixtures thereof. Preferred metals are Group VIII metals. Especially preferred are Pt, Pd or mixtures thereof. These metals are loaded at the rate of 0.1 to 30 wt. %, based on catalyst. Catalyst preparation and metal loading methods are described for example in U.S. Pat. No. 6,294,077, and include for example ion exchange and impregnation using decomposable metal salts. Metal dispersion techniques and catalyst particle size control are described in U.S. Pat. No. 5,282,958. Catalysts with small particle size and well dispersed metal are preferred.

The molecular sieves are typically composited with binder materials that are resistant to high temperatures and may be employed under dewaxing conditions to form a finished dewaxing catalyst or may be binderless (self-bound). The binder materials are usually inorganic oxides such as silica, alumina, silica-aluminas, binary combinations of silicas with other metal oxides such as titania, magnesia, thoria, zirconia and the like and tertiary combinations of these oxides such as silica-alumina -thoria and silica-alumina magnesia. The amount of molecular sieve in the finished dewaxing catalyst is from 10 to 100, preferably 35 to 100 wt. %, based on catalyst. Such catalysts are formed by methods such spray drying, extrusion and the like. The dewaxing catalyst is used in the unsulfided form. The dewaxing catalysts are also preferably in the reduced form.

A further description of the dewaxing catalysts is amplified by the preparation and use of a ZSM-48 zeolite which is a preferred embodiment. A dewaxing catalyst comprising a ZSM-48 zeolite component and a hydrogenation component is known and disclosed, for example, in U.S. Pat. Nos. 4,397,827; 4,585,747; 5,075,269 and EP 0 142 317, the disclosures of which are incorporated herein by reference. A ZSM-48 zeolite is a medium pore size, acidic crystalline silica-alumina molecular sieve, having a ten sided ring pore structure and is prepared with an organic directing agent. After preparation it is converted to the hydrogen form by ion exchange and calcination. In making a catalyst useful in the process of the invention, the hydrogen form ZSM-48 zeolite is composited with a binder and or matrix component and, if desired, one or more additional porous catalyst support components which will preferably not adversely effect its isomerization activity or increase its cracking activity. Such components may comprise, for example, silica, alumina and preferably non-acidic gamma alumina, non-acidic forms of amorphous and crystalline silica-aluminas, clays such as bentonite and kaolin, and the like. The hydrogenation component may comprise at least one Group VIII metal component and preferably at least one noble Group VIII metal component, as in Pt and Pd. Noble metal concentration will range from about 0.1-5 wt. % of the metal, and more typically from about 0.2-1 wt. %, based on the total catalyst weight, including the ZSM-48 zeolite component and any binder or other support or matrix component used in the catalyst composite. The Group VIII referred to herein refers to Group VIII as found in the Sargent-Welch Periodic Table of the Elements copyrighted in 1968 by the Sargent-Welch Scientific Company. The one or more hydrogenation components may be deposited on, composited or ion-exchanged with, the ZSM-48 or other components or a composite of same, by any suitable means. Such means are known and include, for example impregnation or ion-exchange. The ZSM-48 catalyst used in the examples below comprised the hydrogen form of ZSM-48, an alumina binder and a noble metal as the hydrogenation component. An aqueous solution of a decomposable salt of the metal was impregnated onto the ZSM-48 zeolite/alumina composite, followed by calcining to decompose the salt to the metal. The resulting catalyst was then reduced in hydrogen prior to the oxygenate treatment of the invention. The reduction and/or subsequent treatment can be achieved either in-situ in the isomerization reactor or ex-situ in a separate vessel.

The ZSM-48 catalyst is reduced, preferably with hydrogen, prior to the oxygenates treatment. The one or more oxygenates used to treat the catalyst may be carried in a hydrocarbon and the treatment comprises contacting the reduced catalyst with a hydrocarbon stream containing the one or more oxygenates. The hydrocarbon carrier, which in an embodiment of the invention is at least a portion of the hydrocarbon product synthesized by a Fischer-Tropsch hydrocarbon synthesis reaction, may or may not comprise the feed to be dewaxed. All or a portion of the oxygenates used for the treatment may be added to the hydrocarbon or they may be indigenous to it. For example, raw, untreated Fischer-Tropsch light oil and wax typically contain indigenous oxygenates, formed as a consequence of the synthesis reaction. This light oil or wax can be used to treat the catalyst and the wax can then be hydrodewaxed by the treated catalyst.

One aspect of the invention has been demonstrated using raw (untreated) Fischer-Tropsch wax, containing from about 400-1500 wppm oxygen in the form of indigenous oxygenates, for the treatment, which was followed by using the treated catalyst to hydrodewax the same waxy feed. Consequently, the oxygenates used for the treatment were present during the subsequent hydrodewaxing. It has also been demonstrated using a raw (untreated) Fischer-Tropsch synthesized light oil fraction containing 15 wt. % oxygenates, measured as the total weight of oxygen-containing molecules. No oxygenates were found in the hydrodewaxed hydrocarbon products. Hydrodewaxing occurs during the treatment, but initially not with the higher hydrodewaxed product yield obtained after the catalyst has been treated sufficiently long enough for it to line out. This is explained below. The wax and light oil were formed from a Fischer-Tropsch hydrocarbon synthesis reaction over a non-shifting cobalt catalyst.

If the indigenous oxygenates are not present in a sufficient amount, then additional oxygenates are simply added to the feed for the treatment. In another embodiment, a hydrocarbon other than the feed to be hydrodewaxed may be used as the carrier for the oxygenates treatment. For the treatment, the oxygenates will be present in an amount of at least 100 wppm, measured as oxygen, of the hydrocarbon used for the treatment, preferably at least 200 wppm and more preferably at least 400 wppm. The presence of greater amounts of oxygenates (e.g., $\geq$3,000 wppm) will not adversely effect the catalyst, process or hydrodewaxed products. Preferred oxygenates are oxygen-containing molecules which comprise functional groups containing hydroxyl, alcohols, esters, ethers, ketones, aldehydes, carboxylic acids and mixtures thereof, more preferably comprising one or more alcohols. Another preferred oxygenate is water which may be generated from other oxygenates under hydrodewaxing conditions. If one or more oxygenates are added to a hydrocarbon stream used for the treatment, they may be discontinued after the catalyst has lined out, which may take from two weeks to a month. However, leaving them in the feed being hydrodewaxed does not adversely effect the hydrodewaxing reaction or the catalyst. Line out may be determined by observing the cracking activity, as reflected in a reduction in either or both gas make and extent of feed conversion to lower boiling hydrocarbons. The catalyst is considered to be lined out, when the cracking activity has been reduced to a more or less constant value.

The hydrodewaxing removes the oxygenates, which are therefore typically not found in the hydrodewaxed products. The oxygenates treatment is conducted at the same or different conditions used for the subsequent hydrodewaxing, after the catalyst has been treated. In the examples below, the catalyst treatment was initiated at a temperature of almost 300° F. (167° C.) below the subsequent hydrodewaxing temperature. Hydrodewaxing reaction conditions include respective temperatures, hydrogen partial pressures, liquid hourly space velocities and hydrogen treat gas rates broadly ranging from 450-850° F. (232-454° C.), 10-2,000 psig (170-13891 kPa), 0.1-5.0 LHSV and 500-10000 scf/B (89-1780 m$^3$/m$^3$). These conditions will more typically range from 500-750° F. (260-399° C.), 100-1,000 psig (791-6996 kPa,), 0.5-3.0 LHSV, and 1000-5000 scf/B (178-890 m$^3$/m$^3$) with pressures of from 200-700 psig (1480-4928 kPa) preferred.

The wax or waxy hydrocarbons produced by a Fischer-Tropsch reaction are hydrodewaxed using the treated catalyst of the invention to produce dewaxed products of reduced pour point comprising at least one of (i) a distillate fuel fraction and (ii) a lubricant fraction. Typically, the hydrodewaxing reduces the pour point of the hydrodewaxed product to the desired specification to form one or more of (a) one or more distillate fuel stocks used for blending, and (b) one or more lubricant base stocks. The one or more lubricant base stocks may or may not include a heavy lubricant base stock. In a preferred embodiment, the hydrodewaxed lubricant product includes one or more lubricant base stocks and more preferably also a heavy lubricant base stock. By distillate fuel is meant a hydrodewaxed hydrocarbon fraction, boiling somewhere in the range of from about $C_5$ up to about 550-730° F. (288-388° C.) and includes naphtha, diesel and jet fuel. In the context of the invention, the heavy fraction comprises a heavy lubricant oil fraction which, when hydrodewaxed, comprises a heavy lubricant base stock. By lubricant base stock, is meant a lubricant oil having an initial boiling point above 600° F. (316° C.) and more typically at least about 700-750° F. (371-399° C.), that has been hydrodewaxed to the desired pour and cloud points. A heavy lubricant base stock has an initial boiling point in the range of from about 850-1000° F. (454-538° C.), with an end boiling point above 1000° F. and preferably above 1050° F. (566° C.). The initial and end boiling points values referred to herein are nominal and refer to the T5 and T95 cut points obtained by gas chromatograph distillation (GCD), using the method set forth below.

Distillate fuel and lubricant base stocks produced according to the invention are typically hydrofinished at mild conditions and optionally dehazed, to improve color and stability, to form finished fuel and lubricant base stocks. As is known, haze is cloudiness or a lack of clarity, and is an appearance factor. Dehazing is typically achieved by either catalytic or absorptive methods to remove those constituents that result in haziness. Hydrofinishing is a very mild, relatively cold hydrogenating process, which employs a catalyst, hydrogen and mild reaction conditions to remove trace amounts of heteroatom compounds, aromatics and olefins, to improve oxidation stability and color. Hydrofinishing reaction conditions include a temperature of from 302 to 662° F. (150 to 350° C.) and preferably from 302 to 482° F. (150 to 250° C.), a total pressure of from 400 to 3000 psig. (2859 to 20786 kPa), a liquid hourly space velocity ranging from 0.1 to 5 LHSV ($hr^{-1}$) and preferably 0.5 to 3 $hr^{-1}$. The hydrogen hourly treat gas rate will range from 250 to 10000 scf/B (44.5 to 1780 $m^3/m^3$). The catalyst will comprise a support component and at least one catalytic metal component of metal from Groups VIB (Mo, W, Cr) and/or iron group (Ni, Co) and noble metals (Pt, Pd) of Group VIII. The Groups VIB and VIII referred to herein, refers to Groups VIB and VIII as found in the Sargent-Welch Periodic Table of the Elements copyrighted in 1968 by the Sargent-Welch Scientific Company. The metal or metals may be present from as little as 0.1 wt. % for noble metals, to as high as 30 wt. % of the catalyst composition for non-noble metals. Preferred support materials are low in acid and include, for example, amorphous or crystalline metal oxides such as alumina, silica, silica alumina and ultra large pore crystalline materials known as mesoporous crystalline materials, of which MCM-41 is a preferred support component. The preparation and use of MCM-41 is known and disclosed, for example, in U.S. Pat. Nos. 5,098,684, 5,227,353 and 5,573,657.

Fuel and lubricant base stocks respectively comprise hydrodewaxed fuel and lubricant fractions boiling within the distillate fuel and lubricant oil boiling ranges, having low temperature properties, including pour and cloud points, sufficiently lower than what the respective fraction had prior to the hydrodewaxing, to meet desired specifications or requirements. A fuel or lubricant is prepared by forming a mixture of the respective stock and an effective amount of at least one additive or, more typically, an additive package containing more than one additive. Illustrative, but non-limiting examples of such additives for a finished lubricant (lubricant) include one or more of a detergent, a dispersant, an antioxidant, an antiwear additive, an extreme pressure additive, a pour point depressant, a VI improver, a friction modifier, a demulsifier, an antioxidant, an antifoamant, a corrosion inhibitor, and a seal swell control additive. The stock used in forming the mixture is typically one that has been mildly hydrofinished and/or dehazed after hydrodewaxing, to improve its color, appearance and stability. Low temperature property requirements will vary and some depend on the geographical location in which the fuel or lubricant will be used. For example, jet fuel must have a freeze point of no higher than −47° C. Diesel fuel has respective summer and winter cloud points, varying by global region, from −15 to +5° C. and −35 to −5° C. Low temperature properties for conventional light and medium lubricant base stocks, may include a pour point of about −20° C. and a cloud point typically no more than 15° C. higher. A heavy lubricant base stock will typically be clear and bright at room temperature and pressure conditions of 75° F. (24° C.) and one atmosphere (101 kPa) pressure. However, in some cases the cloud point may be higher than 75° F. (24° C.).

The waxy feed or wax to be hydrodewaxed comprises all or a portion of the waxy hydrocarbon fraction produced in a Fischer-Tropsch hydrocarbon synthesis reactor, which is liquid at the reaction conditions. It is known that in a Fischer-Tropsch hydrocarbon synthesis process, liquid and gaseous hydrocarbon products are formed by contacting a synthesis gas comprising a mixture of $H_2$ and CO with a Fischer-Tropsch catalyst, in which the $H_2$ and CO react to form hydrocarbons. The synthesis gas typically contains less than 0.1 vppm and preferably less than 50 vppb of sulfur or nitrogen in the form of one or more sulfur and nitrogen-bearing compounds. Methods for removing nitrogen and sulfur from synthesis gas down to these very low levels are known and disclosed in, for example, U.S. Pat. Nos. 6,284,807; 6,168,768; 6,107,353 and 5,882,614.

In the process of the invention, the noncobalt Fischer-Tropsch catalyst comprises a catalytically effective amount of at least one of Fe, Ni, Ru, Re or Rh, preferably Fe and Ru, and optionally one or more promoters such as Mn, Ti, Mg, Cr, Ca, Si, Al, Cu, Th, Zr, Hf, U, Mg and La on a suitable inorganic support material, preferably one which comprises one or more refractory metal oxides. Useful catalysts and their preparation are known and illustrative, but nonlimiting examples may be found, for example, in U.S. Pat. Nos. 4,568,663; 4,663,305; 4,542,122; 4,621,072, 5,545,674 and U.S. published application 20020128331.

Fixed bed, fluid bed and slurry hydrocarbon synthesis processes are well known and documented in the literature. In all of these processes the synthesis gas is reacted in the presence of a suitable Fischer-Tropsch type of hydrocarbon synthesis catalyst, at reaction conditions effective to form hydrocarbons. Some of these hydrocarbons will be liquid, some solid (e.g., wax) and some gas at standard room temperature conditions of temperature and pressure of 25° C. and one atmosphere (101 kPa) pressure. Slurry Fischer-Tropsch hydrocarbon synthesis processes are often preferred, because they are able to produce more of the relatively high molecular weight, paraffinic hydrocarbons useful for lubricant and heavy lubricant base stocks. In the practice of the invention, the waxy hydrocarbons or wax feed may be produced in a slurry, fixed or fluidized bed Fischer-Tropsch reactor.

Fischer-Tropsch wax contains indigenous oxygenates. For example, Table A below lists the ranges of indigenous oxygenates, measured as oxygen, obtained as a function of boiling range, from wax synthesized using a non-shifting catalyst comprising a rhenium promoted cobalt catalytic component. In Table A, the oxygen is that from the oxygen-containing organic compounds or oxygenates and is given as oxygen and not as the wppm or wt. % of oxygenated molecules themselves. When, for example, wax is referred to as containing from 400-600 wppm oxygenates, measured as oxygen, it means that the amount of oxygen from the oxygenates in the wax was determined to be from 400-600 wppm. The reactor wax in the table is defined as having a boiling range of from about 500° F. (260° C.), up to more than 1,000° F. (538° C.), while the hot separator wax boils from about 350-700° F. (177-371° C.).

TABLE A

| | Alcohols wppm | Ethers wppm | Esters wppm | Total Oxygen wt. % |
|---|---|---|---|---|
| Reactor wax | 67-1259 | 86-270 | 67-109 | 0.06-0.2 |
| Hot separator wax | 1519-3394 | — | — | 0.17-0.39 |

Table B below lists the concentrations of these three types of oxygenates in the same kind of Fischer-Tropsch wax at three different molecular carbon numbers, which are representative of three different molecular weight ranges.

TABLE B

| Carbon Number | Oxygenates, wppm | | |
| --- | --- | --- | --- |
| | Alcohols | Ethers | Esters |
| 10 | 510 | 5 | — |
| 15 | 240 | 6 | — |
| 31 | 105 | 10 | 12 |

In the illustrative, but nonlimiting examples below, the wax was produced in a slurry Fischer-Tropsch reactor, containing a non-shifting, rhenium promoted cobalt catalyst having a titania support component and an initial boiling point of about 450° F. (232° C.). This wax typically comprises 90 or more weight percent paraffins, with up to 2-4 wt. % oxygenates and up to 2-5 wt. % olefins. Aromatics were not detectable by NMR analysis and the wax contained less than 1 wppm sulfur and less than 1 wppm nitrogen. The wt. % total oxygen is measured by neutron activation. The total oxygen content may be placed on a water-free basis by measuring water content using calcium carbide (to form acetylene) followed by GC-MS if the water content is less than about 200 wppm. For greater than 200 wppm water content, the Karl-Fischer method in ASTM standard D-4928 is used. The total oxygenate content is determined by high-resolution NMR, while primary alcohols, ketones and aldehydes are determined by GC-MS. Acids, esters and other dioxygenates are determined by IR or GC-FID and GC-MS. Aromatics are determined by X-Ray Fluorescence (XRF), as described in ASTM Standard D-2622, while olefins are determined using a Bromine Index, determined by coulimetric analysis per ASTM standard D-2710. Sulfur is measured by XRF as per ASTM standard D-2622 and nitrogen by syringe/inlet oxidative combustion with chemiluminescence detection per ASTM standard D-4629.

In the integrated process embodiment for synthesizing and dewaxing waxy hydrocarbons, the process comprises reacting $H_2$ and CO in the presence of a Fischer-Tropsch hydrocarbon synthesis catalyst at reaction conditions effective to form waxy hydrocarbons, a portion of which are liquid at the reaction conditions, hydrodewaxing at least a portion of these waxy hydrocarbons in the presence of hydrogen and an unsulfided catalyst comprising a hydrogenation component and a dewaxing component, wherein the catalyst has been reduced and then treated with a hydrocarbon stream containing one or more oxygenates, prior to hydrodewaxing, to (i) increase the catalyst's selectivity for hydrodewaxing, (ii) reduce gas make during hydrodewaxing, and (iii) produce dewaxed hydrocarbons reduced in pour and cloud point. By hydrogen is meant hydrogen, a hydrogen hourly treat gas or a hydrogen-rich tail gas comprising at least 60 and preferably at least 80% hydrogen, with the remainder being inert with respect to the hydrodewaxing catalyst and the hydrocarbon synthesis catalyst upstream. Hydrogen or a hydrogen treat gas with such low sulfur levels can be obtained from various sources, including but not limited to treating a slip stream of the synthesis gas (e.g., a methanator or shift reactor, TSA, PSA, membrane separation and the like, as is known and disclosed, for example, in U.S. Pat. No. 6,147,126) to remove CO from the synthesis gas and produce a high quality hydrogen gas.

The invention will be further understood with reference to the examples below.

EXAMPLES

In Example 1, the oxygenates-containing hydrocarbon used to treat the reduced ZSM-48 hydrodewaxing catalyst was a Fischer-Tropsch wax, while in Example 2 it was an oxygenates-containing light oil that was also produced in the Fischer-Tropsch hydrocarbon synthesis reactor. Both were synthesized together in a slurry Fischer-Tropsch reactor, in which the $H_2$ and CO were reacted in the presence of a titania supported, rhenium-promoted cobalt catalyst to form hydrocarbons, most of which were liquid at the reaction conditions. The oxygenates in both the wax and light oil were also formed in the hydrocarbon synthesis reactor as a consequence of the synthesis reaction, and were therefore indigenous to the wax and oil. These oxygenates were mostly alcohols, along with minor amounts of esters and ethers. The wax, which was solid at ambient conditions, comprised a 450° F.+ (232° C.) waxy fraction described below and contained from 400-600 wppm oxygenates measured as oxygen. The light oil, which was liquid at ambient conditions, comprised from about $C_5$-$C_{20}$ molecules, had a boiling range of about 97-526° F. (36-274° C.) and contained about 7010 wppm oxygenates, measured as total oxygen content, as alcohols, esters and organic acids. About 5.2 wt. % of the light oil comprised normal alcohols as ethanol, propanol, hexanol, heptanol, octanol, nonanol, decanol, undecanol, dodecanol, tridecanol, pentanol and hexadecanol.

| Wt. % Boiling Point Distribution of Fischer-Tropsch Reactor Waxy Feed | |
| --- | --- |
| 450 + (232° C.+) | 98 |
| 700° F. + (371° C.+) | 71.5 |
| 1000° F. + (538° C.+) | 26.2 |

In addition to the oxygenates-containing wax and light oil used to treat the reduced dewaxing catalyst, a 320° F.+ (160° C.+) and a 700° F.+ (371° C.+) waxy isomerate were used (i) to contact the reduced catalyst as a comparison to the oxygenates treatment of the invention and (ii) as waxy feeds for the hydrodewaxing in Example 1. The waxy isomerates contained no oxygenates, and those used in Example 1 were obtained by hydrodewaxing an oxygenatescontaining 450° F.+ (232° C.+) Fischer-Tropsch wax over a catalyst comprising 0.3 wt. % Pd on an amorphous silica alumina support. For Example 2 a light isomerate having a boiling range of from about 700-950° F. (371-510° C.) was used. The isomerization removed all the oxygenates from the wax. The light isomerate was obtained using a ZSM-48 catalyst. All three isomerate fractions still contained some wax after the isomerization. For example, the light isomerate had a +14° C. pour point and produced 22 wt. % wax when solvent dewaxed with MIBK at −18° C.

In all the examples below, the waxy feed was hydrodewaxed over a particulate ZSM-48 catalyst and the hydrogen treat gas was pure hydrogen. The ZSM-48 catalyst comprised 0.6 wt. % Pt as the hydrogenating component, on a composite of the hydrogen form of the ZSM-48 zeolite and an alumina binder. The hydrogen form ZSM-48 zeolite component of the catalyst was prepared according to the procedure in U.S. Pat. No. 5,075,269, the disclosure of which is incorporated herein by reference. The Pt component was added by impregnation, followed by calcining. The calcined particles were loaded into a fixed bed pilot plant reactor and reduced with flowing hydrogen in-situ in the reactor. The temperature was then lowered and the reduced catalyst was treated by slowly (to avoid exotherms) introducing the hot liquid wax into the reactor over a period of about six hours, to insure all the reduced catalyst particles were immersed in the waxy liquid and therefore contacted by the oxygenates. After this, the temperature in the reactor was raised to the hydrodewaxing temperature and the feed to be dewaxed passed into it. The hydrogen flow into the reactor was maintained during the treatment and subsequent hydrodewaxing. The pour point and conversion data in the Figures were taken after the reactor had lined out, which typically took about 30 days.

The 700° F.+ (371° C.+) yields and pour points in the Figures refer to those for the hydrodewaxed (isomerized) 700° F.+ (371° C.+) fraction. The $CH_4$/iso-$C_4H_{10}$ ratio is a mole ratio and is a measure of hydrogenolysis ($CH_4$ make) to beta scission (iso-$C_4H_{10}$ make). The gas make is the weight percent of feed converted to $C_1$-$C_4$ hydrocarbons. The 700° F. (371° C.) conversion is the weight percent of the 700° F.+ (371° C.+) feed material converted to hydrocarbons boiling below 700° F. (700° F.−/(371° C.−)). The 700° F.+ (371° C.+) yield vs. pour point refers to the weight percent yield of isomerized hydrocarbons boiling above 700° F. (371° C.), at a feed conversion level to the corresponding pour point on the graph. The 700° F.+ (371° C.+) conversion is calculated as follows:

700° F.+conversion=[1−(wt. % 700° F.+fraction in product)/(wt. %700° F.+in feed)]×100

Gas chromatograph distillations (GCD) were conducted using a high temperature GCD method modification of ASTM D-5307. The column consisted of a single capillary column with a thin liquid phase, less than 0.2 microns. External standards were used, consisting of a boiling point calibrant ranging from 5 to 100 carbons. A temperature programmed injector was used and, prior to injection, the samples were gently warmed using hot water. Boiling ranges were determined using this method and the T5 and T95 GCD results. Cloud point values were measured using ASTM D-5773 for Phase Two Tec Instruments under the lubricant procedure method. Pour point was measured according to ASTM D-5950 for ISL Auto Pour Point measurement. Viscosity and viscosity index were measured according to the ASTM protocol D-445 and D-2270, respectively.

Example 1

Treated Catalyst

The ZSM-48 catalyst was reduced for six hours in flowing hydrogen, at a temperature of 500° F. (260° C.) and a pressure of 500 psig (3549 kPa). The hydrogen flow rate was a gas hourly space velocity (GHSV) of 445. Following reduction and while maintaining the hydrogen flow and pressure, the temperature was reduced to 350° F. (177° C.), and then the Fischer-Tropsch 450° F.+ (232° C.) oxygenates-containing liquid wax was slowly introduced into the reactor over a period of six hours to treat the catalyst. While maintaining the pressure, hydrogen and an oxygenates-containing wax flow rate of 1 LHSV into the reactor, the temperature was raised to a hydrodewaxing temperature range of 610-630° F. (321-332° C.) and dewaxing continued for 50 days. Then the feed was sequentially switched to 320° F.+ (160° C.) and 700° F.+ (371° C.+) waxy isomerates for 45 days. These isomerates had previously been partially hydrodewaxed, did not contain oxygenates and were obtained by hydrodewaxing oxygenates-containing Fischer Tropsch wax. The results for this treated catalyst are shown in FIGS. 1-6.

FIG. 1 shows the very low hydrogenolysis to beta scission ratio ($CH_4$/iso-$C_4H_{10}$) for the treated catalyst of the invention during hydrodewaxing and the much greater ratio incurred using the untreated catalyst of Comparative Example A. The open squares at day 60 correspond to the start-up of the treated catalyst on the oxygenates-containing wax feed. After only about six days of hydrodewaxing, the beta scission ratio was less than 0.5. The solid circles at day 115 correspond to the start up of the untreated catalyst of Comparative Example A. At the same time the untreated catalyst was started up, the feed for the treated catalyst was switched to the non-oxygenate, waxy isomerate feeds. The lined out behavior for the treated catalyst of the invention is unchanged by the feed switchover at about the 115$^{th}$ day. In contrast, the behavior of the untreated catalyst is very different at start up. The beta scission ratio is high, in excess of 6, and drops more slowly with time. The scatter in the data observed with the untreated catalyst of Comparative Example A is due to changes in temperature. However, the treated catalyst of the invention underwent the same temperature changes at this time and does not exhibit scatter.

Figure 2:
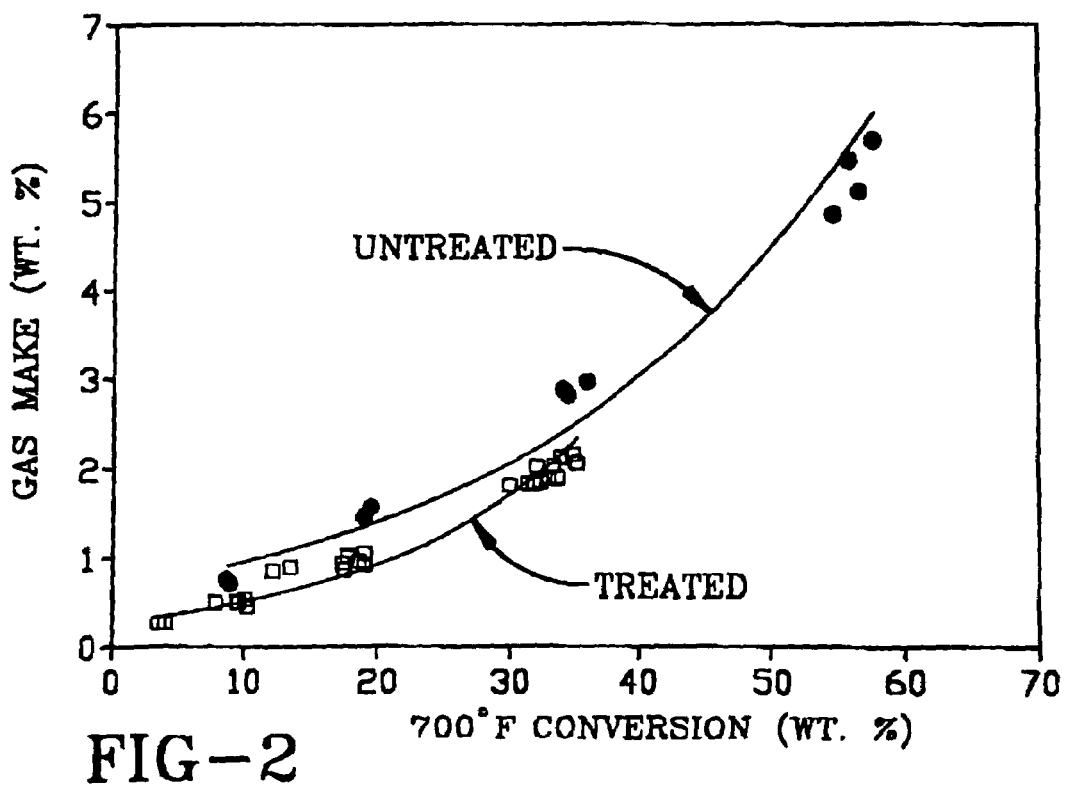
FIG. 2 compares gas make as a function of feed conversion for a treated and an untreated catalyst.

FIG. 2 compares gas make as a function of 700° F.+ (371° C.+) feed conversion to lower boiling hydrocarbons (700° F.− (371 ° C.−)) for the two catalysts. Over the entire conversion range, the untreated catalyst of Comparative Example A had higher gas make, shown as circles, than the treated catalyst of the invention, shown as open squares.

Figure 3:
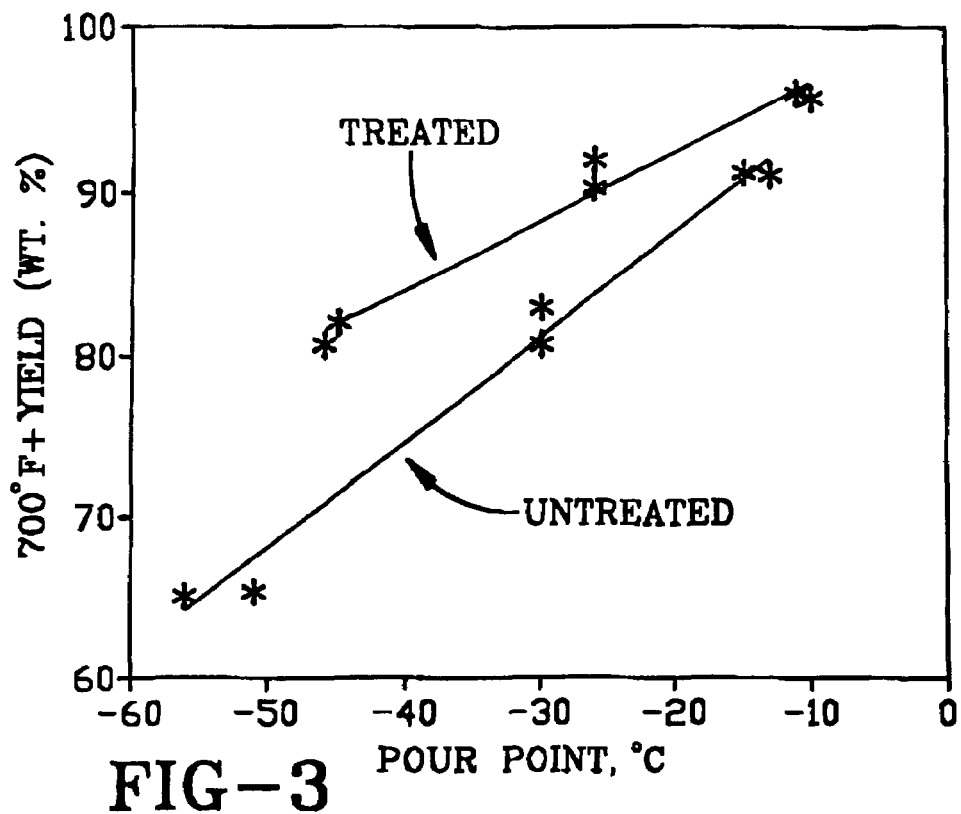
FIG. 3 compares the 700° F.+ (371° C.) hydrodewaxed oil yield as a function of pour point, for a treated and untreated catalyst.

FIG. 3 compares the 700° F.+ (371° C.+) dewaxed oil yield as a function of pour point. For a given pour point target, it shows the dewaxed oil yield is substantially greater using the treated catalyst of the invention.

Comparative Example A

Untreated Catalyst

This example was similar to Example 1, except for the treatment of the reduced catalyst. In this experiment, instead of treating the reduced catalyst with the oxygenates-containing, Fischer-Tropsch wax, the reduced catalyst was immersed in the 320° F.+ (160° C.+), oxygenates-free waxy isomerate for 6 hours. Then, as in Example 1, the temperature was raised to a hydrodewaxing range of 570-620° F. (299-327° C.). The hydrodewaxing reaction was run for 45 days, during which time the fed was switched from the 320° F.+ (160° C.+) isomerate, to the 700° F.+ (371° C.+) isomerate (also free of oxygenates). The results are shown in FIGS. 1-3 and discussed above in Example 1.

Comparative Example B

Sulfided Catalyst

In this experiment, the calcined catalyst was reduced as in Example 1 and then sulfided, by treating it with 2% hydrogen disulfide in hydrogen at 700° F. (371° C.+) and 500 psig (3549 kPa) for four hours. Following sulfiding, it was placed on stream with the oxygenates-free, 320° F.+ (160° C.+) waxy isomerate for about 20 days at temperatures between 540-580° F. (282-304° C.), using pure hydrogen at 2500 SCF/B and 500 psig. (3549 kPa). The waxy isomerate feed rate was 1 LHSV. Then the feed was switched to the 450° F.+ (232° C.) oxygenates-containing Fischer-Tropsch wax and run for an additional 84 days at the same conditions. The results are shown as compared to the treated catalyst of the invention of Example 1, in FIGS. 4, 5 and 6.

Figure 4:
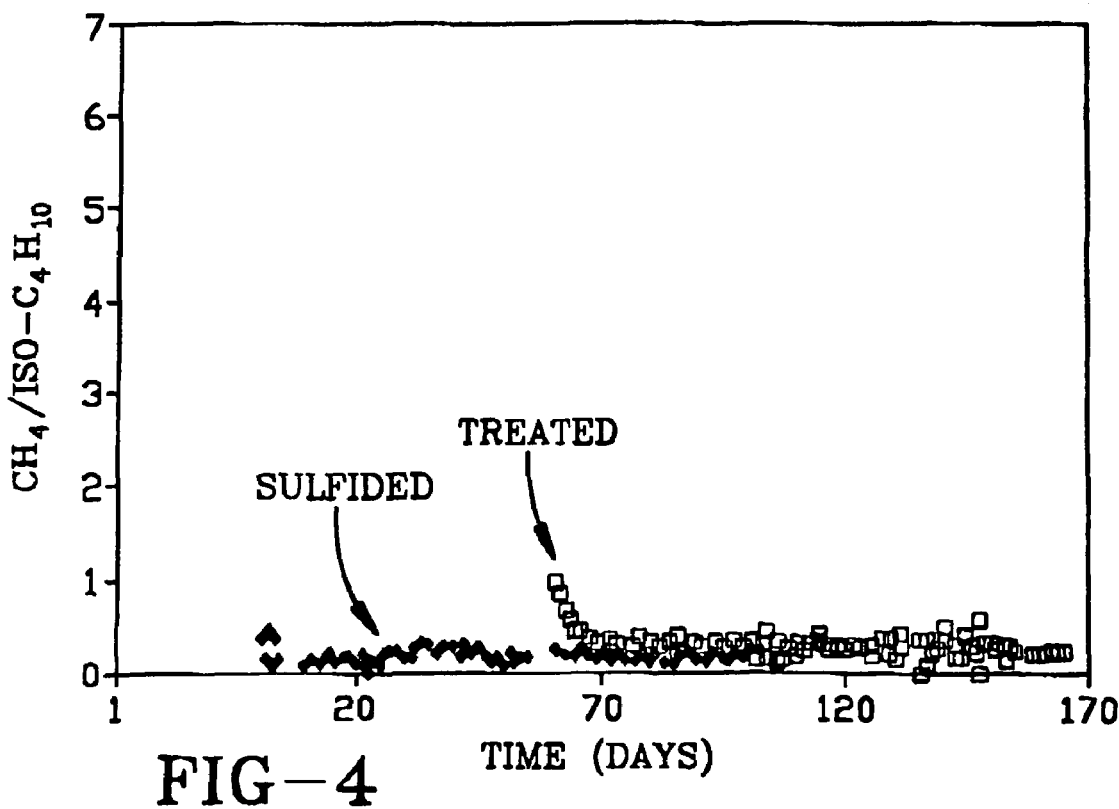
FIG. 4 shows the hydrogenolysis to beta scission ratio similarity between a treated and a sulfided catalyst.

The results for the ratio of hydrogenolysis to beta scission are shown in FIG. 4. The sulfided catalyst is shown as the closed diamonds and the oxygenates treated catalyst of the invention of Example 1 as open squares. The sulfided catalyst lined out to a ratio of less than 0.5 almost immediately, while it took several days for the treated catalyst of the invention to reach the same ratio. However, after line out was reached, both catalysts were about the same.

Figure 5:
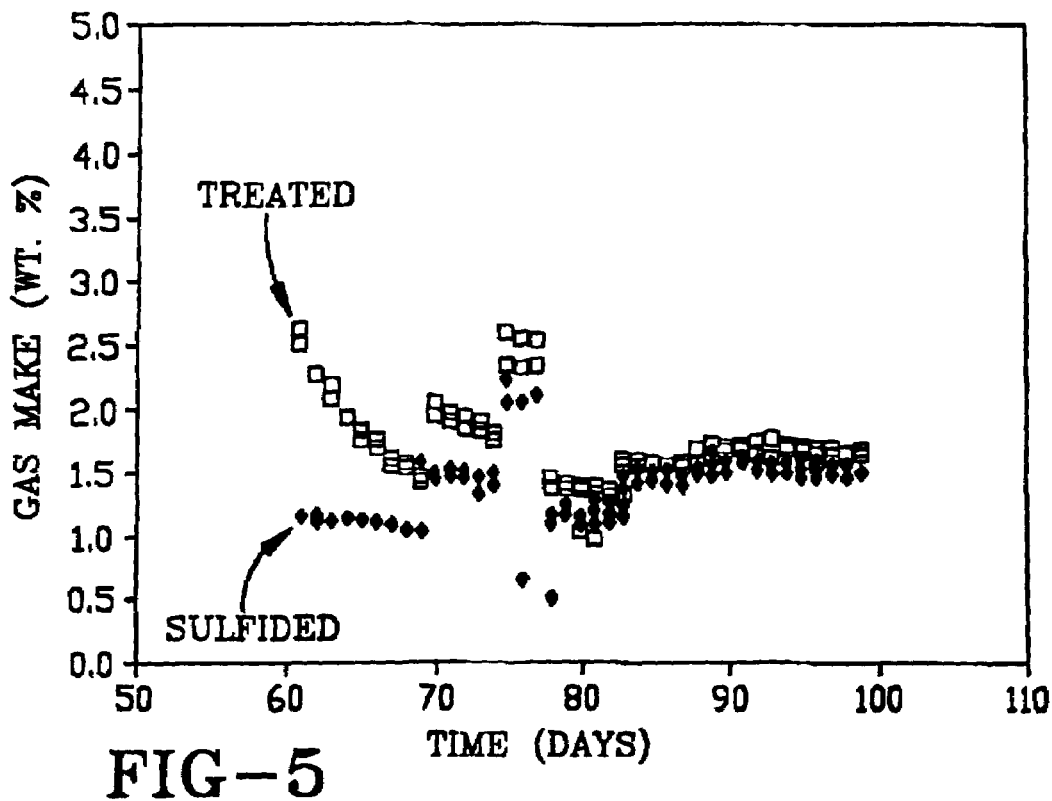
FIG. 5 shows the gas make similarity for both a treated and a sulfided catalyst.
Figure 6:
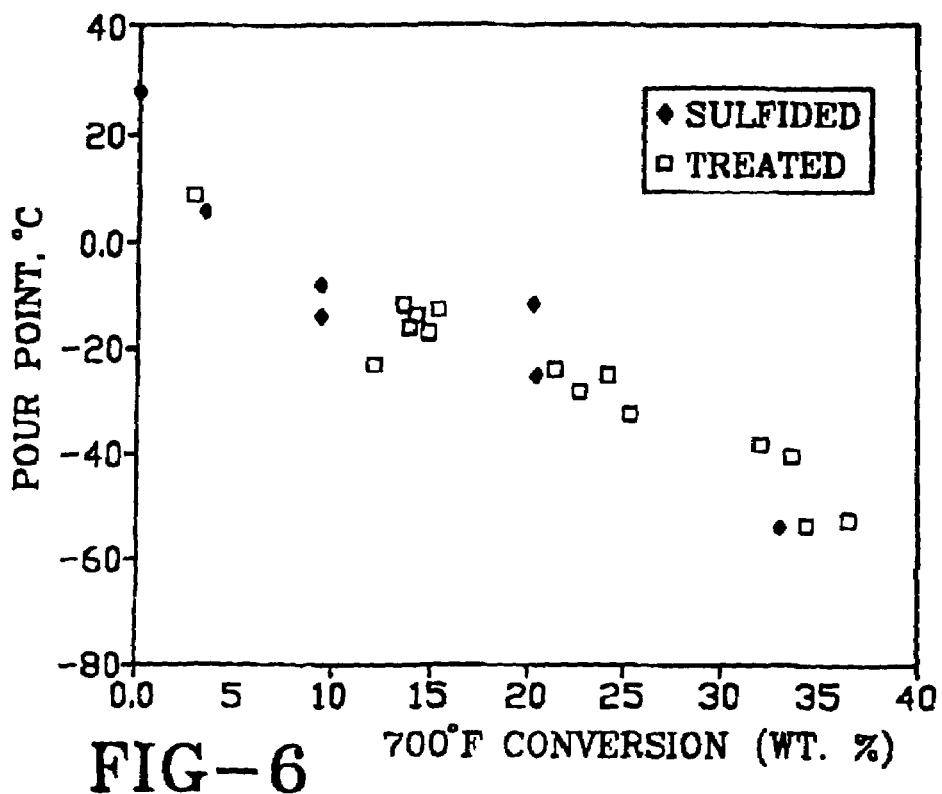
FIG. 6 is a graph comparing the extent of 700° F. (371° C.) conversion at a given pour point for both a treated and a sulfided catalyst.

FIG. 5 shows the total gas make for both catalysts is similar after line out. On day 60 both catalysts were on the oxygenated feed and were both undergoing a series of temperature changes. Nevertheless, both are experimentally indistinguishable after line out. FIG. 6 shows the pour point-conversion data for both catalysts is virtually indistinguishable within experimental error.

Example 2

Treated Catalyst

Figure 7:
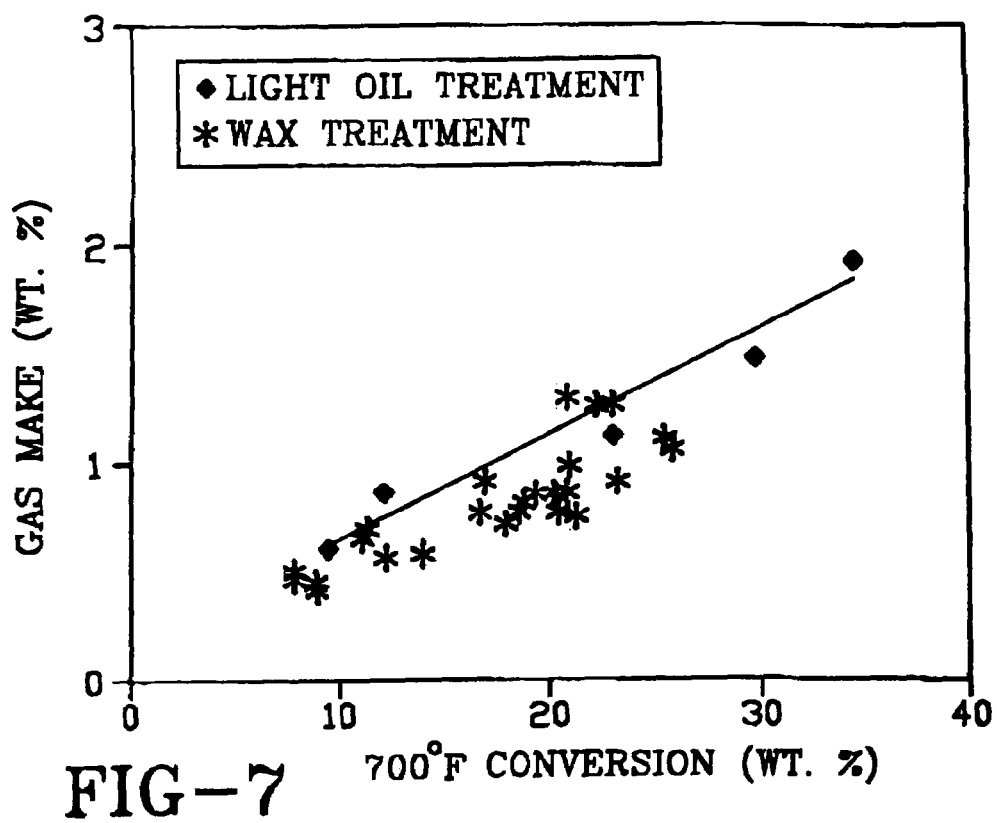
FIG. 7 shows the gas make at various 700° F. (371° C.) conversion levels for oxygenated light oil and wax treated catalysts.
Figure 8:
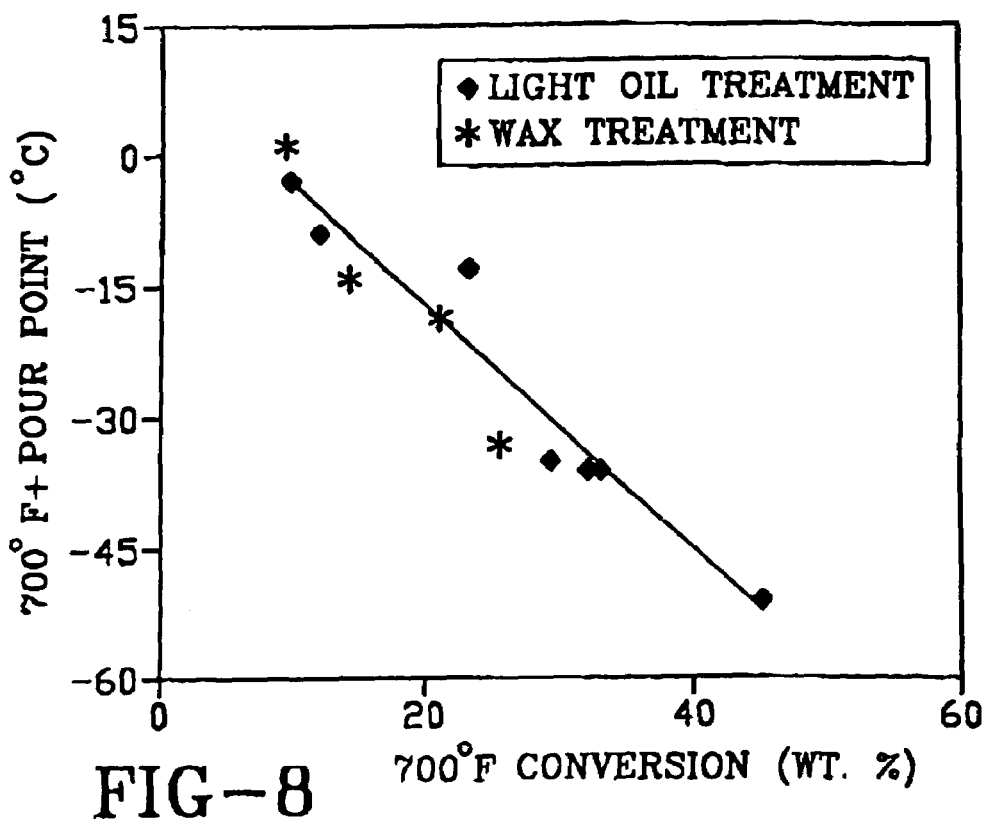
FIG. 8 shows the pour point at various 700° F. (371° C.) conversion levels for oxygenated light oil and wax treated catalysts.

This experiment was similar to that of Example 1 in all respects, except that (i) after the treatment the raw wax was dewaxed for only 6 days at 600° F. (316° C.) and 500 psig (3549 kPa) hydrogen, then (ii) the pressure was reduced to 250 psig (1825 kPa), and dewaxing continued for another 25 days, before the feed was switched from the raw wax to the light isomerate described above, which was dewaxed at 600° F. (316° C.) and 250 psig (1724 kPa). The dewaxing results for the light isomerate are shown in FIGS. 7 and 8.

Example 3

Treated Catalyst

This experiment was similar to that of Examples 1 and 2, except that the catalyst was reduced at 250° F. (121° C.) and 250 psig (1825 kPa), instead of 500° F. (260° C.) and 500 psig (3549 kPa) and, prior to hydrodewaxing, instead of the oxygenates-containing wax, the oxygenates-containing light oil described above was used to treat the reduced catalyst at 250 psig. (1724 kPa) and 350° F. (177° C.). Then the temperature was increased to 600° F. (316° C.) and the feed slowly switched to the 700-950° F. (371-482° C.) cut of isomerate feed, over a line-out time of only 14 days. The dewaxing results for the light isomerate dewaxed by the catalyst treated by the light oil of this example are shown in FIGS. 7-8.

Referring now to FIGS. 7 and 8, it is seen that there is essentially no difference between using an oxygenates-containing light oil and an oxygenates-containing wax to treat the ZSM-48 dewaxing catalyst. This is reflected in the conversion vs. pour point and gas make dewaxing results being essentially the same for both.

Example 4

Other Catalysts

Catalytic dewaxing was conducted at 750 psig (5272 kPa) $H_2$, 1.0 LHSV, gas treat rate of 2500 SCF/BBL (445 $m^3/m^3$). 5 cc of catalyst was crushed to 14/35 mesh and mixed with diluent. The feed for all of the catalysts was a hydroisomerized Fischer Tropsch wax, which was fractionated to produce a feed which is nominally 700° F.+ with a wax content of 6.42% as measured by solvent dewaxing with 100% MIBK.

The catalysts tested all had 0.5 wt. % platinum as the dehydrogenated component, except Z-876A which was 0.3 wt. % Pt and 0.15 wt. % Pd. Operating temperatures ranged from 550° F. (288° C.) to 580° F. (304° C.). The products from the various catalysts were analyzed for pour point and viscosity and the data is included in the table below. The yields shown in the table correspond to those obtained over operation of the listed catalyst alone. These results show the performance of these catalysts without oxygenate treatment for the dewaxing of Fischer Tropsch derived isomerates. The lubes produced from these catalysts show reasonable viscosities and pour points. The addition of oxygenates to these catalysts would be expected to produce a yield enhancement similar to that shown in previous examples for the selective catalytic dewaxing in the production of lubes using ZSM-48.

TABLE C

| Catalyst | 700° F. + Yield | KV @ 100° C. | VI | Pour Point ° C. |
|---|---|---|---|---|
| Pt/TON | 94.49 | 5.1 | 148 | −21 |
| PT/ZSM-23 | 90.18 | 5.22 | 147 | −27 |
| Z-876 (FER) | 64.9 | 4.74 | 141 | −44 |
| Pt/FER | 59.38 | 4.68 | 141 | −38 |
| Pt/LaFER | 89.24 | 4.76 | 142 | −33 |

In Table C, TON is theta-1 (ZSM-22) and FER is ferrierite.

What is claimed is:

1. A process for hydrodewaxing waxy Fischer-Tropsch hydrocarbons produced over a noncobalt catalyst to produce a dewaxed base stock which process comprises contacting said hydrocarbons with hydrogen, in the presence of a treated, unsulfided hydrodewaxing catalyst comprising a Group VIII metal component and a ZSM-48 molecular sieve at reaction conditions effective to hydrodewax said waxy hydrocarbons and reduce their pour and cloud points, wherein said catalyst has been reduced and then treated with a hydrocarbon stream containing one or more oxygenates in an amount of at least 100 wppm, measured as oxygen, prior to said hydrodewaxing to increase said catalyst's selectivity for hydrodewaxing.

2. A process according to claim 1 wherein said hydrocarbon stream used for said treatment is produced over a noncobalt Fischer Tropsch catalyst.

3. A process according to claim 2 wherein the noncobalt catalyst is at least one of Fe, Ni, Ru, Re or Rh.

4. A process according to claim 3 wherein the noncobalt catalyst is Fe or Ru.

5. A process according to claim 4 wherein said oxygenates comprise one or more oxygen containing molecules.

6. A process according to claim 5 wherein said oxygenates comprise one or more functional groups containing hydroxyl, mono and polyhydric alcohols, esters, ethers, ketones, aldehydes, carboxylic acids, and mixtures thereof.

7. A process according to claim 6 wherein said one or more oxygenates are present in an amount of at least 200 wppm, measured as oxygen.

8. A process according to claim 7 wherein said dewaxed base stock comprises at least one of (a) a fuel stock and (b) a lubricant base stock.

9. A process according to claim 8 wherein said stock has been hydrorefined and optionally dehazed.

10. A process according to claim 9 wherein said stock comprises a lubricant base stock and wherein said lubricant base stock is combined with one or more lubricant additives to form a lubricant.

11. A process for synthesizing and hydrodewaxing waxy hydrocarbons comprises reacting $H_2$ and CO in the presence of a non-shifting Fischer-Tropsch hydrocarbon synthesis catalyst having a noncobalt catalytic component, at reaction conditions effective to form waxy hydrocarbons, hydrodewaxing at least a portion of said waxy hydrocarbons in the presence of hydrogen and an unsulfided hydrodewaxing catalyst comprising a Group VIII metal component and ZSM-48 molecular sieve at reaction conditions effective to hydrodewax said waxy hydrocarbons to reduce their pour and cloud points and produce one or more hydrodewaxed hydrocarbon fractions boiling in the fuel and/or lubricant oil range, and wherein said hydrodewaxing catalyst has been reduced and then treated with a hydrocarbon stream containing at least 100 wppm of one or more oxygenates, measured as oxygen, prior to said hydrodewaxing to increase said catalyst's selectivity for hydrodewaxing.

12. A process according to claim 11 wherein said noncobalt component is at least one of Fe, Ni, Ru, Re or Rh.

13. A process according to claim 12 wherein said oxygenates comprise one or more oxygen containing molecules.

14. A process according to claim 13 wherein said oxygenates comprise one or more functional groups containing hydroxyl, mono and polyhydric alcohols, esters, ethers, ketones, aldehydes, carboxylic acids, and mixtures thereof.

15. A process according to claim 14 wherein at least a portion of said one or more oxygenates are indigenous to said treating hydrocarbon stream and are present in an amount of at least 200 wppm, measured as oxygen.

16. A process according to claim 15 wherein said hydrodewaxed hydrocarbon fractions comprise one or more of a fuel and a lubricant base stock and wherein one or more stocks are hydrorefined and optionally dehazed.

17. A process according to claim 16 wherein said stock comprises a lubricant base stock which is combined with one or more lubricant additives to form a lubricant.

18. A process for hydrodewaxing waxy Fischer Tropsch hydrocarbons produced over a noncobalt catalyst which comprises contacting said waxy hydrocarbons containing at least 100 wppm of one or more oxygenates, measured as oxygen, with hydrogen, in the presence of an unsulfided hydrodewaxing catalyst comprising a ZSM-48 molecular sieve and a Group VIII metal component, at reaction conditions effective to hydrodewax said waxy hydrocarbons and reduce their pour and cloud points, wherein said hydrodewaxing catalyst has been reduced and treated with said waxy hydrocarbons to increase said catalyst's selectivity for hydrodewaxing.

19. A process according to claim 18 wherein said oxygenates comprise one or more oxygen containing molecules.

20. A process according to claim 19 wherein said oxygenates comprise one or more functional groups containing hydroxyl, mono and polyhydric alcohols, esters, ethers, ketones, aldehydes, carboxylic acids, and mixtures thereof.

21. A process according to claim 20 wherein the noncobalt catalyst is at least one of Fe, Ni, Ru, Re or Rh.

22. A process according to claim 21 wherein the oxygenate is present in an amount of at least 200 wppm, measured as oxygen.

23. A process for hydrodewaxing Fischer-Tropsch hydrocarbons produced over at least one of a Fe or Ru Fischer-Tropsch catalyst which comprises contacting said hydrocarbons with hydrogen, in the presence of a treated, unsulfided hydrodewaxing catalyst comprising a Group VIII metal component and a dewaxing component which is ZSM-48 at reaction conditions effective to hydrodewax said waxy hydrocarbons and reduce their pour and cloud points, wherein said catalyst has been reduced and then treated with a hydrocarbon stream containing at least 100 wppm, measured as oxygen, of one or more oxygenates prior to said hydrodewaxing to increase said catalyst's selectivity for hydrodewaxing.

24. A process according to claim 23 wherein said oxygenates comprise one or more oxygen containing molecules.

25. A process according to claim 24 wherein said oxygenates comprise one or more functional groups containing hydroxyl, mono and polyhydric alcohols, esters, ethers, ketones, aldehydes, carboxylic acids, and mixtures thereof.

26. A process according to claims 1, 11, 18 or 23 wherein said reaction conditions effective to hydrodewax include temperatures of from 232-399° C., pressures of from 170-13891 kPa, liquid hourly space velocities of from 0.1-5.0 and hourly treat gas rates of 89-1789 $m^3/m^3$.

27. A process according to claims 1, 11, 18 or 23 wherein said hydrodewaxing catalyst further comprises an alumina or alumina-containing metal oxide binder.

28. A process for hydrodewaxing waxy Fischer-Tropsch hydrocarbons produced over a noncobalt catalyst which comprises contacting said hydrocarbons with hydrogen, in the presence of a treated, unsulfided hydrodewaxing catalyst comprising a Group VIII metal component and a ZSM-48 molecular sieve dewaxing component, at reaction conditions effective to hydrodewax said waxy hydrocarbons and reduce their pour and cloud points, wherein said catalyst has been reduced and then treated with a hydrocarbon stream containing at least 100 wppm, water, measured as oxygen prior to said hydrodewaxing to increase said catalyst's selectivity for hydrodewaxing.

29. A process according to claim 28 wherein said hydrocarbon stream includes one or more indigenous oxygenates.

30. A process according to claim 29 wherein said oxygenates comprise, one or more functional groups containing hydroxyl, mono and polyhydric alcohols, esters, ethers, ketones, aldehydes, carboxylic acids, and mixtures thereof.

31. A process according to claim 30 wherein said waxy hydrocarbons comprise hydrocarbons boiling in either or both the fuels and lubricant oil ranges.

32. A process according to claim 31 wherein said reaction conditions effective to hydrodewax include temperatures of from 232-399° C., pressures of from 170-13891 kPa, liquid hourly space velocities of from 0.1-5.0 and treat gas rates of 89-1789 $m^3/m^3$.

33. A process according to claim 32 wherein said hydrodewaxing catalyst further comprises an alumina or alumina-containing metal oxide binder.

34. A process according to claim 11 wherein the hydrocarbon stream used for the treatment is produced over a Fischer-Tropsch catalyst having a noncobalt catalytic component.

35. The process of claim 1, 11, 18 or 23 wherein the catalyst is treated with a hydrocarbon stream containing one or more oxygenates in an amount of at least 100 wppm, measured as oxygen, initiated at a temperature below hydrodewaxing temperatures prior to the hydrodewaxing of the waxy Fischer-Tropsch hydrocarbons.

36. The process of claim 28 wherein the catalyst is treated with to hydrocarbon stream containing at least 100 wppm water measured as oxygen initiated at a temperature below hydrodewaxing temperatures, prior to the hydrodewaxing of the waxy Fischer-Tropsch hydrocarbons.

* * * * *